(12) United States Patent
Fischer-Carne et al.

(10) Patent No.: US 8,891,229 B2
(45) Date of Patent: Nov. 18, 2014

(54) LOCKING STRUCTURE FOR A TRUCK OF A SWITCHGEAR DRAWOUT CIRCUIT BREAKER

(75) Inventors: Patrick R. Fischer-Carne, New Smyrna Beach, FL (US); Robert S. Karnbach, Lake Mary, FL (US); Rahul Pawar, Lake Mary, FL (US)

(73) Assignee: ABB Technology AG, Zürich (CH)

( * ) Notice: Subject to any disclaimer, the term of this patent is extended or adjusted under 35 U.S.C. 154(b) by 313 days.

(21) Appl. No.: 13/615,808

(22) Filed: Sep. 14, 2012

(65) Prior Publication Data

US 2013/0077208 A1 Mar. 28, 2013

Related U.S. Application Data

(60) Provisional application No. 61/538,965, filed on Sep. 26, 2011.

(51) Int. Cl.
*H02B 11/00* (2006.01)
*H02B 11/127* (2006.01)
*H02B 11/133* (2006.01)
*H02B 11/167* (2006.01)

(52) U.S. Cl.
CPC ............ *H02B 11/127* (2013.01); *H02B 11/133* (2013.01); *H02B 11/167* (2013.01)
USPC ............ 361/606; 361/605; 70/86; 200/50.23; 200/50.24; 200/50.25

(58) Field of Classification Search
USPC ................ 361/606–607; 70/85–86, 114, 117; 200/50.23–50.25
See application file for complete search history.

(56) References Cited

U.S. PATENT DOCUMENTS

| 3,187,526 | A | * | 6/1965 | Moler | 70/100 |
|---|---|---|---|---|---|
| 4,288,944 | A | * | 9/1981 | Donovan | 49/395 |
| 7,022,923 | B2 | * | 4/2006 | Liebetruth | 200/50.21 |
| 8,250,887 | B2 | * | 8/2012 | MacKay et al. | 70/1.5 |
| 8,383,970 | B2 | * | 2/2013 | Pawar et al. | 200/50.21 |
| 2013/0264178 | A1 | * | 10/2013 | Fleitmann et al. | 200/50.24 |

\* cited by examiner

*Primary Examiner* — Robert J Hoffberg
(74) *Attorney, Agent, or Firm* — Manelli Selter PLLC; Edward J. Stemberger

(57) ABSTRACT

A truck (12') for mounting a circuit breaker (13) in a switchgear frame (14') includes wheels (16), a racking screw (20), a nut (22) threaded with the racking screw. The nut floats linearly with respect to the truck. A spring (23) is provided between a portion of the truck and the nut such that during movement of the truck into the frame, rotation of the racking screw causes linear movement of the nut, with the nut pushing against the spring, with the spring pushing the truck to move the truck linearly. Locking structure is coupled with the such that when the truck is stopped and the racking screw continues to rotate, the nut will move to compress the spring, causing the locking structure to move from an unlocked position, disengaged with the frame, to a locked position, engaged with the frame.

17 Claims, 2 Drawing Sheets

LOCKING STRUCTURE FOR A TRUCK OF A SWITCHGEAR DRAWOUT CIRCUIT BREAKER

This application claims priority from U.S. Provisional Application No. 61/538,965, filed on Sep. 26, 2011.

BACKGROUND

The present invention relates to an electrical switchgear and, more particularly, to a drawout circuit breaker truck having locking structure for restraining the circuit breaker truck and circuit breaker thereon under fault conditions in a frame of the switchgear.

With reference to FIG. 1, conventional switchgear, generally indicated at 10, includes a circuit breaker truck assembly, generally indicated at 11. The truck assembly 11 includes a circuit breaker truck 12 that carries racked-in power circuit breaker 13 so that the circuit breaker 13 can be withdrawn from a frame 14 of the switchgear 10 for maintenance. In particular, the frame 14 includes at least one rail 15. Wheels 16 (only one shown in FIG. 1) are mounted to at least one side of the circuit breaker truck 12. The wheels 16 are supported by the rail 15 such that an inside portion of each wheel 16 of the circuit breaker truck 12 slides on the rail 15. Under short circuit conditions, there are moments on the circuit breaker poles that cause the circuit breaker truck assembly 11 to twist about its horizontal and vertical axes. This movement may force the circuit breaker truck assembly 11 to jump off the rails 15 and raises the possibility of an arc initiation if the primary contacts separate from the bushings.

Thus, there is a need to provide locking structure to restrain the circuit breaker truck, and thus circuit breaker thereon, in place under fault conditions.

SUMMARY

An objective of the present invention is to fulfill the need referred to above. In accordance with the principles of an embodiment, this objective is obtained by providing a truck for mounting a circuit breaker in a switchgear frame. The switchgear frame includes rails. The truck includes wheels for engaging the rails when the truck is moved into the frame; a racking screw; and a racking screw nut in threaded engagement with the racking screw. The racking screw nut is constructed and arranged to float linearly with respect to the truck. A spring is provided between a portion of the truck and the racking screw nut such that during movement of the truck into the frame, rotation of the racking screw causes linear movement of the racking screw nut, with the racking screw nut pushing against the spring, with the spring pushing the truck to move the truck linearly. Locking structure is coupled with the racking screw nut and is constructed and arranged such that when the truck is stopped and the racking screw continues to rotate, the racking screw nut will move to compress the spring, causing the locking structure to move from an unlocked position, disengaged with the frame, to a locked position, engaged with the frame.

In accordance with another aspect of an embodiment, a method of locking a truck, carrying a circuit breaker, into a switchgear frame provides a switchgear frame including rails, and at least one lock receiving opening in the frame. A truck carries a circuit breaker. The truck has wheels; a racking screw; a racking screw nut in threaded engagement with the racking screw, the racking screw nut being constructed and arranged to float linearly with respect to the truck; a spring between a portion of the truck and the racking screw nut; and locking structure coupled to the racking screw nut. The racking screw is rotated to cause linear movement of the nut, with the nut pushing against the spring, with the spring pushing the truck to move the truck linearly along the wheels that roll on the rails. Movement of the truck is stopped while continuing to rotate the racking screw so that the nut will move to compress the spring, causing the locking structure to move from an unlocked position, disengaged with the lock receiving opening in the frame, to a locked position, engaged with lock receiving opening in the frame.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
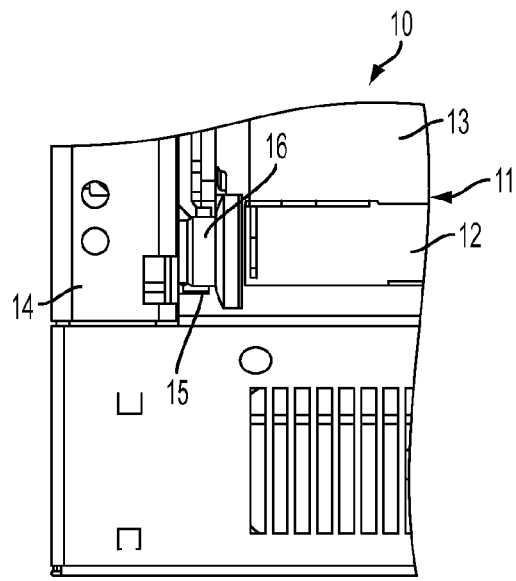
FIG. 1 is a partial front view of a conventional switchgear showing a wheel of a circuit breaker truck assembly mounted on a rail of a frame.
Figure 2:
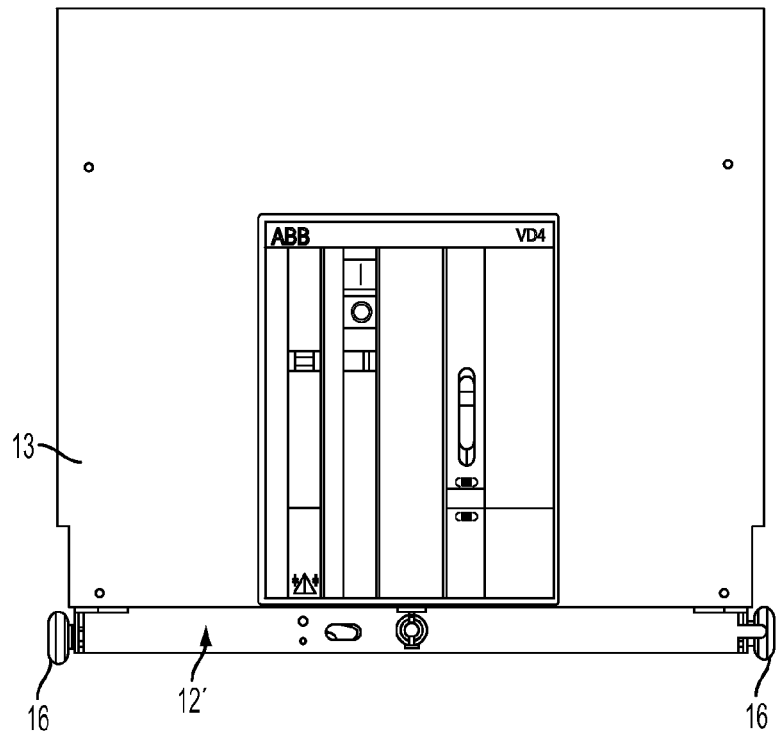
FIG. 2 is an end view of the circuit breaker truck of the embodiment, shown with a circuit breaker mounted thereon.

With reference to FIG. 2 an end view of a circuit breaker truck, generally indicated at 12', is shown in accordance with an embodiment of the invention. The circuit breaker truck 12' carries racked-in power circuit breaker 13 so that the circuit breaker 13 can be withdrawn from a switchgear frame 14' (FIG. 3) for maintenance. Wheels 16 are mounted to opposing sides of the circuit breaker truck 12'. The wheels 16 are supported by rails 15 (FIG. 3) of the frame 14' such that an inside portion of each wheel 16 of the circuit breaker truck 12' slides on the associated rail 15. The frame 14' can be of the type disclosed in U.S. Pat. No. 7,124,488, the content of which is hereby incorporated by reference into this specification.

Figure 3:
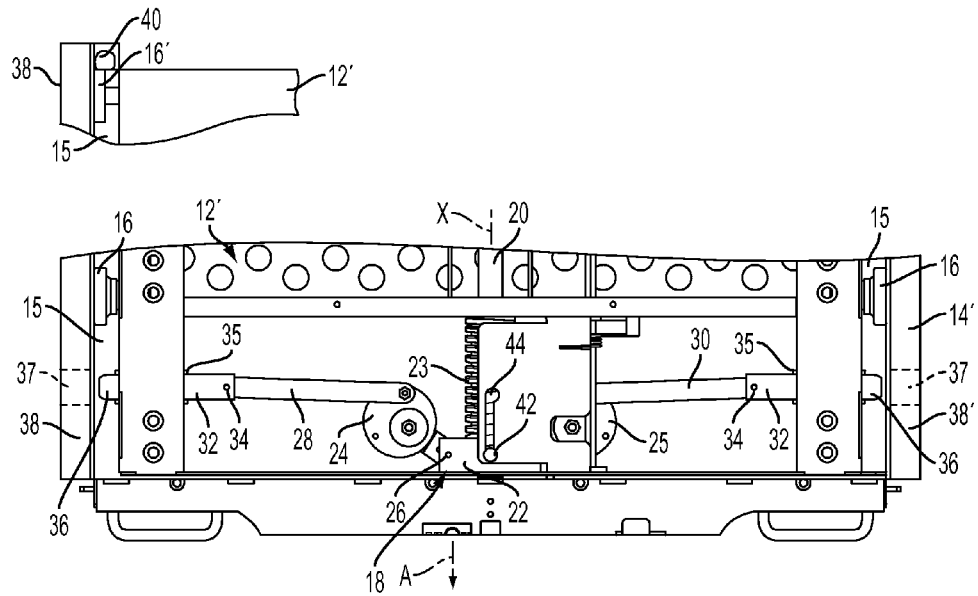
FIG. 3 is a top view of a portion of the circuit breaker truck of FIG. 2, shown mounted in an unlocked position in a switchgear frame and without the circuit breaker thereon.

With reference to FIG. 3, the truck 12', absent the circuit breaker 13 for clarity of illustration, is shown disposed in the frame 14'. A conventional lead or racking screw 20 is provide, preferably of the type disclosed in U.S. Pat. No. 6,689,968 B2, the contents of which is hereby incorporated by reference into this specification. A racking screw nut 22 is in threaded engagement with the racking screw 20 in the conventional manner. The racking screw nut 22 differs from conventional racking screw nuts in that it is allowed to float linearly or along the longitudinal axis X of the racking screw 20 with respect to the truck 12'. A heavy die spring 23 is provided between a portion of the truck 12' and the nut 22 so that that torque associated with rotation of the screw 20 is transmitted to the nut 22 via the threads, imparting linear movement of the nut 22. The nut 22 pushes on the spring 23 and the spring pushes on the portion of the truck 12' to move the truck 12' linearly on the wheels 16 during racking into the frame 14'. Since the spring 23 has a high spring rate, pushing of the nut 22 on the spring 23 does not compress the spring 23.

The truck 12' includes locking structure, generally indicated at 18. The locking structure 18 includes a first crank arm 24 and a second crank arm 25 that are each pivotally coupled to the opposing ends of the nut 22 via a pivot connection 26. A first elongated lock bar 28 is pivotally coupled to the first crank arm 24 and a second elongated lock bar 30 is pivotally coupled to the second crank arm 25. To provide some play in the linear movement of the lock bars 28, 30, an end member 32 is pivotally coupled to an associated lock bar 28, 30, via a pivot connection 34. The end members 32 can be considered to be part of the lock bars 28, 30. The end members 32 are guided by supports 35 of the truck 12' for linear movement in a direction that is generally transverse to the direction of movement of the nut 22. Each end member 32 has a free end 36 (defining an end of the associated lock bar) disposed adjacent to surfaces defining a lock receiving opening 37 in an associated sidewall 38, 38' of the frame 14'. In the embodiment, the openings 37 are in opposing sidewall 38, 38' of the frame 14', but can be provided in the opposing rails 15 of the frame 14'.

As shown in FIG. 3, in unlocked position of the locking structure 18, the ends 36 of the end members 32 are in a retracted position, disposed outside of the openings 37 in the frame 14'. The ends 36 are in this retracted, unlocked position since the spring 23 biases the nut 22 in a first direction (arrow A) which places the crank arms 24 and 25 in a first position, defining an unlocked position of the lock bars and associated end members 32. The locking structure 18 is in the unlocked position while moving the truck 12', with circuit breaker 13 thereon, into the switchgear frame 14'.

An important aspect of the embodiment is that a rail 15 that guides the truck wheels 16 must have a stopping block 40 that will stop the truck 12' at the mated position (ends 36 adjacent to openings 37). Thus, the stopping block 40 is placed in at least one of the rails 15 behind the forward-most wheel 16' (FIG. 3) of the truck 12'.

Figure 4:
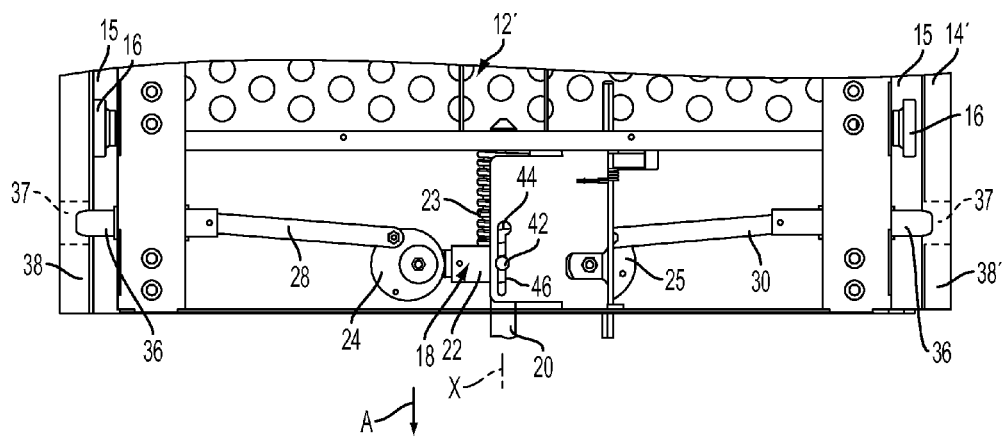
FIG. 4 is a top view of the portion of the circuit breaker truck of FIG. 3, shown mounted in a locked position in the switchgear frame.

After the truck 12' is blocked from moving forward and the racking screw 20 is still rotating, with reference to FIG. 4, the nut 22 will compress the spring 23, with the nut 22 moving in the direction opposite arrow A, causing the crank arms 24, 25 to rotate simultaneously from the first position thereof to actuate the lock bars 28, 30 and the end members 32. This motion extends the ends 36 of the end members 32 outwardly and into the openings 37, thereby defining an extended, locked position of the locking structure 18. The nut 22 stops moving when a locking pin 42 on the top of the nut 22 moves into a locking hole 44 in the truck 12'. The locking hole 44 is at the end of a slot 46 defined in the truck 12' and the locking pin 42 moves in the slot 46 until it reaches the locking hole 44.

The nut 22 applies a thrust force via the spring 23 that is strong enough to overcome the mating forces of the breaker contacts, but provides enough compression distance to allow for adequate actuation of the lock bars 28, 30. In the embodiment, it takes 900 lbs. to compress the spring 23 one inch.

When in the locked position, if a short condition causes moments on the circuit breaker poles that cause the circuit breaker truck 12' to twist about its horizontal and vertical axes, the truck 12' will remain on the rails 15 and eliminate the possibility of an arc initiation.

Reversing the racking screw 20 will reverse the process, unlocking the locking structure 18. Thus, rotation of the screw 20 causes linear movement of the nut 22 along the axis X, with the crank arms 24, 25, causing linear movement of the lock bars 28, 30 and thus end members 32 in a direction transverse with respect to the axis X.

Although a pair of crank arms 24, 25 and lock bars 28, 30 (with end members 32) are provided, it can be appreciated that only one crank arm 24 and lock bar 28 (with end member 32) can be provided to lock the truck 12' with respect to the frame 14'. However, providing two lock bars at opposite ends of the truck 12', as shown, ensures that the truck 12' will not be torqued due to a short condition occurrence.

Although not shown, the locking structure 18 can include a longitudinally extending rod coupled to at least one of the crank arms 24, 25, with the rod being coupled to another lock bar so as to lock a different portion of the truck 12' to the frame 14'. For example, the truck 12' can include a vertically extending back-plate so that the back plate (defining a top portion of the truck 12') can be locked to the frame 14' with the additional lock bar. The locking structure 18 thus advantageously provides additional positional stability during short circuit events without any additional steps to be performed by the operator during racking and un-racking of the truck 12'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A truck for mounting a circuit breaker in a switchgear frame, the switchgear frame including rails, the truck comprising:
   wheels for engaging the rails when the truck is moved into the frame,
   a racking screw,
   a racking screw nut in threaded engagement with the racking screw, the racking screw nut being constructed and arranged to float linearly with respect to the truck,
   a spring between a portion of the truck and the racking screw nut such that during movement of the truck into the frame, rotation of the racking screw causes linear movement of the racking screw nut, with the racking screw nut pushing against the spring, with the spring pushing the truck to move the truck linearly, and
   a locking structure coupled with the racking screw nut and constructed and arranged such that when the truck is stopped and the racking screw continues to rotate, the racking screw nut will move to compress the spring, causing the locking structure to move from an unlocked position, disengaged with the frame, to a locked position, engaged with the frame.

2. The truck of claim 1, wherein the locking structure comprises:
   a first crank arm pivotally coupled with the racking screw nut,
   a first lock bar pivotally coupled to the first crank arm, the first lock bar having a first free end,
   wherein the linear movement of the racking screw nut to compress the spring rotates the first crank arm and thus causes the first lock bar to move from the unlocked position, in a retracted state, to the locked position, in an extended state, with the first free end being constructed and arranged to engage the frame.

3. The truck of claim 2, further comprising:
   a second crank arm pivotally coupled to the racking screw nut so that the second crank arm is in opposing relation to the first crank arm, and a second lock bar pivotally coupled to the second crank arm, the second lock bar having a second free end, wherein the linear movement of the racking screw nut to compress the spring rotates the first and second crank arms simultaneously and thus causes the first and second first lock bars to move from the unlocked position to the locked position, with the first and second free ends being constructed and arranged to engage opposing sides of the frame.

4. The truck of claim 3, in combination with the frame, the frame having surfaces defining openings associated with the opposing sides of the frame, the first and second free ends of the first and second lock bars being received in the openings in the locked position.

5. The combination of claim 4, wherein the openings are defined in opposing sidewalls of the frame.

6. The combination of claim 4, further comprising a stop in a rail of the rails to stop movement of the truck at a location where the first and second free ends are aligned with the openings, while the racking screw continues to rotate.

7. The combination of claim 6, wherein the spring is constructed and arranged to be compressed by the racking screw nut only when the movement of the truck is stopped by the stop.

8. The combination of claim 4, in further combination with the circuit breaker mounted to the truck.

9. The truck of claim 2, wherein the first free end is defined by an end member that is pivotally coupled to the first lock bar.

10. The truck of claim 1, wherein the racking screw nut includes a pin and the truck includes a slot and a locking hole at an end of the slot, the pin moving in the slot as the racking screw nut moves, wherein the linear movement of the racking screw nut is stopped when the pin engages the locking hole.

11. A method of locking a truck, carrying a circuit breaker, into a switchgear frame, the method comprising the steps of:
   providing the switchgear frame including rails, and at least one lock receiving opening in the frame,
   providing the truck carrying the circuit breaker, the truck having wheels; a racking screw; a racking screw nut in threaded engagement with the racking screw, the racking screw nut being constructed and arranged to float linearly with respect to the truck; a spring between a portion of the truck and the racking screw nut; and a locking structure coupled to the racking screw nut,
   rotating the racking screw to cause linear movement of the nut, with the nut pushing against the spring, with the spring pushing the truck to move the truck linearly along the wheels that roll on the rails, and
   stopping movement of the truck while continuing to rotate the racking screw so that the nut will move to compress the spring, causing the locking structure to move from an unlocked position, disengaged with the at least one lock receiving opening in the frame, to a locked position, engaged with the at least one lock receiving opening in the frame.

12. The method of claim 11, wherein the step of stopping the movement of the truck includes providing a stop in a rail at a location where a portion of the locking structure is aligned with the at least one lock receiving opening.

13. The method of claim 12, wherein the spring is provided so as to be compressed by the racking screw nut only when the movement of the truck is stopped by the stop.

14. The method of claim 11, wherein the step of providing the truck includes providing the locking structure to comprise:
   a first crank arm pivotally coupled with the racking screw nut,
   a first lock bar pivotally coupled to the first crank arm, the lock bar having a first free end,
   wherein the linear movement of the racking screw nut to compress the spring rotates the first crank arm and thus causes the first lock bar to move from the unlocked position to the locked position, with the first free end extending into one of the at least one lock receiving opening.

15. The method of claim 14, wherein the locking structure further comprises:
   a second crank arm pivotally coupled to the racking screw nut so that the second crank arm is in opposing relation to the first crank arm, and
   a second lock bar pivotally coupled to the second crank arm, the second lock bar having a second free end,
   wherein the linear movement of the racking screw nut to compress the spring rotates the first and second crank arms simultaneously and thus causes the first and second lock bars to move from the unlocked position to the locked position, with each of the first and second free ends extending into an associated lock receiving opening of the at least one lock receiving opening.

16. The method of claim 14, wherein the first free end is defined by an end member that is pivotally coupled to the first lock bar.

17. The method of claim 11, wherein the racking screw nut includes a pin and the truck includes a slot and a locking hole at an end of the slot, the method further including:
   permitting the pin to move in the slot as the racking screw nut moves, and
   stopping the linear movement of the racking screw nut when the pin engages the locking hole.

* * * * *